Dec. 8, 1964     A. GIACOMETTI     3,160,889
APPARATUS FOR OBTAINING PHOTOGRAPHIC REPRODUCTIONS
WITH STEREOSCOPICAL EFFECT
Filed June 20, 1962

INVENTOR.
Adelmo Giacometti
BY
Agent

United States Patent Office 3,160,889
Patented Dec. 8, 1964

3,160,889
APPARATUS FOR OBTAINING PHOTOGRAPHIC REPRODUCTIONS WITH STEREOSCOPICAL EFFECT
Adelmo Giacometti, C.so XXII Marzo 22, Milan, Italy
Filed June 20, 1962, Ser. No. 204,665
Claims priority, application Italy, June 24, 1961
11,666/61
3 Claims. (Cl. 352—60)

This improvement relates to an apparatus for obtaining photographic reproductions with particular regard to cinefilms giving thereto a stereoscopical effect.

In my Italian Patent No. 599,681 the object described is an apparatus capable of taking preferably simultaneously from two different view points, at least a slightly left-hand and a slightly right-hand image of an object to be reproduced and transmitting optical rays or beams defining such images toward a zone situated in front of a single lens and then transmitting again starting from that zone and along distinct optical trajectories said rays forming said slightly right-hand or slightly left-hand images through said single lens toward a film to be exposed.

Said apparatus described in the above-mentioned patent includes reflecting and/or refracting means for the transmission of images taken and is characterized by the fact that before the lens a reflecting and/or refracting means is arranged showing two respective reflecting and/or refracting areas, each being arranged in such a way as to receive incident rays or beams which are in turn transmitted through reflecting and/or refracting means situated at least at two different view points and each being suitable to explore from different view points the subject to be reproduced.

In the aforementioned patent it is stated that images transmitted onto the films overlap in the central area in relation to all those points of the subject, which prove to be substantially identical if taken from one or the other view point whereas toward the edge sides an area of small extension receives optical rays being only pertinent to the one or the other of the view points.

In order to obtain an overlapping also on edges it is necessary to keep the shutter fully open.

This may be conducive to difficulties in the shutter adjustment for obtaining at any point of the image the exact intensity of light as necessary to expose the film.

To obviate such inconvenience a second lens has been provided between the first lens and the film, said second lens takes the space image developed by the first lens and transmits it onto the film to be exposed. This second lens facilitates the image fusion and enables to resort to the shutter and/or sector and to obtain consequently neat images and unaltered colors. By suitably regulating the distance between both lenses one or more remote subjects can be brought into the foreground without having to change the lens as normally done, and such result truly represents another advantage of great significance because the farther the subject to be taken the deeper is the field enabling the overlapping of images.

Together with the regulation of the lens is also made an orientation regulation of the reflecting or refracting means preferably in form of specular surfaces.

Nevertheless, the orientation of the described specular surface requires a high precision degree and slight geometric and dimensional alterations resulting, for example from irregular thermal expansions, are just enough to impair the effect reached by the improved apparatus.

In order to obviate such inconveniences and obtain considerably neat images in each part thereof, it has been found according to the invention that excellent results may be obtained if the reflecting and/or refracting means for transmitting images taken by exploring the subject from different view points are installed vibratively oscillating round a pivot extending substantially perpendicular to the optical axis of the apparatus and parallel to the plane of reflecting means.

The pivot is advantageously supported by the orientable and adjustable carrying part of said reflecting means which are engaged by rotating rollers having a polygonal periphery and possibly rotating in synchronism with the movement of the film to be exposed, elastic means being provided to have such reflecting and/or refracting means adhere to such rotating rollers.

The invention will now be described in a preferred embodiment form by way of non limitative example with reference to the accompanying drawing, in which.

Figure 1:
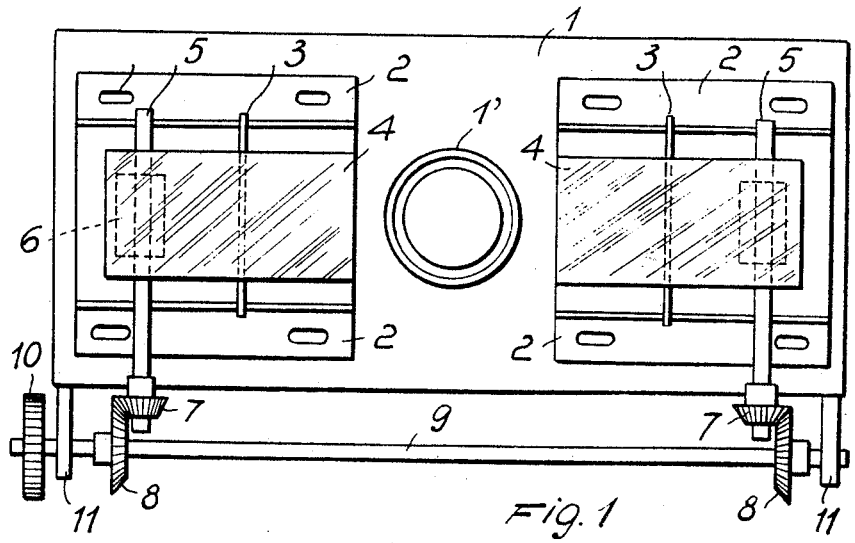
FIG. 1 represents a plan view of the apparatus portion including the reflecting and/or refracting device, with some parts omitted for clarity.
Figure 2:
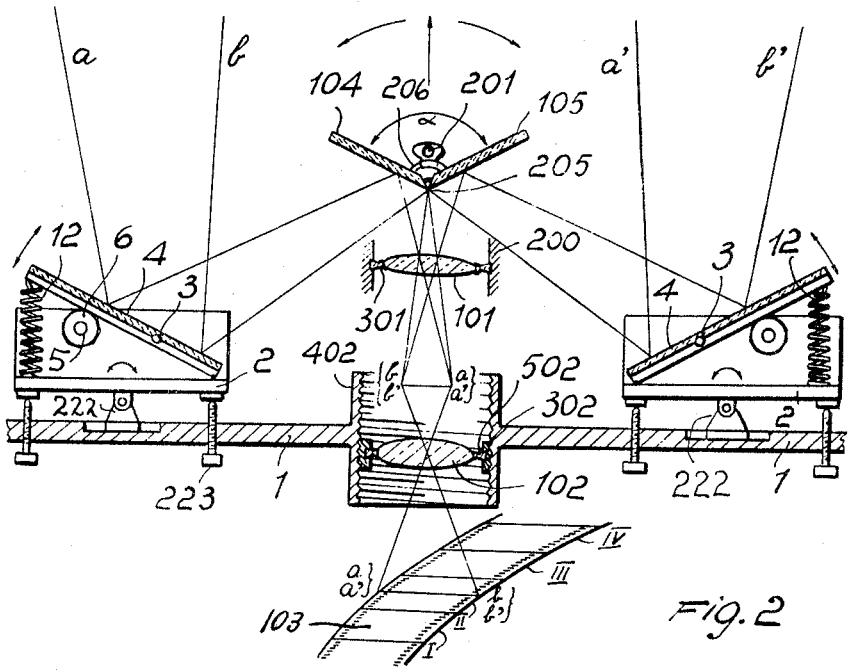
FIG. 2 is a lateral diagrammatic view partially in section of the main members of the apparatus according to this invention.

With reference to the above figures, the device includes a carrying plate 1 having a central hole 1' for the passage of rays getting through the lenses 101 and 102 and on which plate are adjustably mounted L-shaped supports 2 holding up pivots 3 extending somewhat perpendicularly to the optical axis of the apparatus, said pivots 3 supporting turnably flat mirrors 4 placed between L-shaped supports 2.

Flat mirrors 4 reflect the rays $a$, $b$ and $a'$, $b'$ defining the image of the subject taken from two different view points toward the dihedral reflecting mirrors 104, 105 forming a variable alpha angle there between and which reflect such rays toward the lenses 101 and 102 supported at adjustable distance.

Mirros 104 and 105 are hinged at 205 to each other and are supported on the frame 200 of the apparatus through the pin 201 shiftably mounted at its ends in a per se known manner on the frame of the apparatus. The connection between pin 201 and mirrors 104 and 105 is obtained by a compass hingle member 206.

Lens 101 is secured on frame 200 through ring 301 fixed in frame 200.

Lens 102 may be axially displaced by an externally threaded rotatable ring 302 which is screwable in the internally screwed cylinder member 402 rigid with supporting plate 1 and surrounding hole 1'. Threaded ring 302 is internally grooved to support slidably the supporting ring 502 of lens 102.

Rays $a$, $b$ and $a'$, $b'$ coming from the subject to be reproduced pass through the lenses 101 and 102; lens 102 takes the space image developed by the lens 101 and transmits it onto the film 103 to be exposed.

The film 103 is supported movably in a manner which is in itself well-known and not represented therefore on the figure and insures subsequent reproduction of the photograms: I, II, III, IV, etc.

Carried by the upright wing of the L-supports 2 there are further spindles 5 on which are keyed rollers 6 having a faceted or polygonal periphery. On the same spindles 5 are also keyed bevel gears 7 engaging with the corresponding bevel gears 8 which are in turn keyed on motor shaft 9. Such motor shaft receives the motion from a non represented motor through a gear 10 (or a closely analogous means) and is held up by supports 11 fast with base plate 1, which supports 11 can be provided adjustable. The device is completed with tension springs 12 keeping the frame of mirrors 4 adhering to rollers 6.

The L-supports 2 are in turn hingedly supported on carrying plate 1 through hinge support 222. The inclination of the supports 2 may be adjusted by the adjusting screws 223. The functioning of the device is as follows. Once the motor shaft 9 has been set in rotation, bevel gears sets 7 and 8 transmit the rotation motion to spindles 5 and then to rollers 6 fast therewith.

The latter rotate causing a vibratory oscillation of mirrors 4 round the pivots 3.

Such vibrations insure a considerable improvement in transmitting images onto the film to be exposed. In fact, once the inclination of mirrors 4 has been preset with respect to the base plate according to an average position, their vibratory oscillation round said position permits to obtain on the film images better responding to the stereoscopical effects desired because the vibration frequency of mirrors is selected so that the human eye does not perceive such vibrations but is only influenced by the resulting image.

The swinging and displacing of mirrors 4 has been made possible thanks to the revolving and movable mounting of supports 2 on the base plate 1 and to the adjustable mounting of supports 11 of motor shaft 9. Nevertheless, since normally the orientation angular displacement is very small, supports 11 can be fixed and relative displacement of the working organs is then compensated for by the engaging clearance of the gears. In practice materials as well as dimensions could be of whatever type and extent depending upon requirements and furthermore all members could be replaced with other technically equivalent parts.

What I claim is:

1. An apparatus for obtaining photographic reproductions with a stereoscopical effect, comprising at least two coaxial lenses, at least two first reflecting means offset with respect to the axis of the lenses, at least two second reflecting means, in front of said two lenses, said first reflecting means receiving the rays from the subject to be reproduced and reflecting them towards said second reflecting means, said second reflecting means receiving said rays reflected from the first reflecting means and reflecting them towards said lenses, a photosensitive film receiving said rays after their passage through said lenses, frame members for supporting said coaxial lenses, and said first and said second reflecting means, said first reflecting means having hinge means for hingedly connecting said first reflecting surface on one of said frame members, a plane surface rigid with said first reflecting means, a shaft offset with respect to said hinge means and journaled on one of said frame members, said shaft extending parallel to said plane surface, a faceted surface on said shaft in contact with said plane surface, spring means for pressing said faceted surface against said plane surface and transmission means for transmitting a rotatory motion to said shaft.

2. An apparatus according to claim 1, wherein said faceted surface defines the periphery of a polygonal body.

3. An apparatus according to claim 1, wherein the frame member whereon said first reflecting means is hinged comprises adjusting means for adjusting the position thereof with respect to the other component parts of the apparatus.

References Cited in the file of this patent

UNITED STATES PATENTS

| | | |
|---|---|---|
| 2,013,842 | Savage | Sept. 10, 1935 |
| 2,258,903 | Mitchell | Oct. 14, 1941 |
| 2,339,780 | Huitt | Jan. 25, 1944 |
| 2,736,250 | Papritz | Feb. 28, 1956 |